United States Patent [19]
Beermann et al.

[11] 3,975,655
[45] Aug. 17, 1976

[54] COIL END SUPPORT FOR THE STATOR WINDING OF ELECTRIC MACHINES SUCH AS TURBO GENERATORS OR THE LIKE

[75] Inventors: Heinrich Beermann; Willi Jacobs; Dietrich Lambrecht, all of Mulheim, Germany

[73] Assignee: Kraftwerk Union Aktiengesellschaft, Mulheim (Ruhr), Germany

[22] Filed: Feb. 25, 1975

[21] Appl. No.: 552,754

Related U.S. Application Data
[63] Continuation of Ser. No. 371,772, June 20, 1973.

[30] Foreign Application Priority Data
June 26, 1972  Germany............................ 2231292

[52] U.S. Cl................................. 310/260; 310/194
[51] Int. Cl.² ............................................ H02K 3/46
[58] Field of Search ........... 310/254, 257, 258, 259, 310/260, 270, 271, 51, 42, 194, 214, 218

[56] References Cited
UNITED STATES PATENTS

| | | | |
|---|---|---|---|
| 1,238,280 | 8/1917 | Field .................................. | 310/260 |
| 3,293,472 | 12/1966 | Stevens ............................... | 310/260 |
| 3,449,609 | 6/1969 | Thiessen ............................. | 310/260 |
| 3,575,623 | 4/1971 | Stine .................................... | 310/260 |
| 3,649,860 | 3/1972 | Richardson ......................... | 310/260 |
| 3,745,395 | 7/1973 | Koechlin ............................. | 310/260 |

FOREIGN PATENTS OR APPLICATIONS

| | | | |
|---|---|---|---|
| 1,366,320 | 6/1964 | France ................................ | 310/260 |
| 1,053,092 | 3/1959 | Germany ............................ | 310/260 |

*Primary Examiner*—R. Skudy
*Attorney, Agent, or Firm*—Herbert L. Lerner

[57] ABSTRACT

In order to support the coil ends of liquid-cooled stator windings of turbo generators or the like, the coil ends or conductor bars are disposed between a support ring and segment-shaped cover plates. The support ring and cover plates extend about complete circumferences and the conductor bars of the coil ends are rigidly clamped against the support ring by means of clamping bolts which engage the cover plates and the support ring.

1 Claim, 4 Drawing Figures

COIL END SUPPORT FOR THE STATOR WINDING OF ELECTRIC MACHINES SUCH AS TURBO GENERATORS OR THE LIKE

This is a continuation, of application Ser. No. 371,772, filed June 20, 1973.

This invention relates to a support for coil ends for the stator winding of electric machines, particularly turbo generators, having conductor sections which are conically disposed and which extend at an angle to the axis of the machine. This invention further relates to a clamping arrangement for the conductors and particularly to clamping the conductors at least against a support which is disposed radially outwardly and which is axially movable.

Coil end supports of the general type herein under consideration are known from German Published Prosecuted Patent Application DAS No. 1,200,932 which discloses mounting arms extending radially inside and outside of the coil ends in the axial direction and parallel to the peripheral surfaces of the coil ends. These mounting arms are clamped together and against the coil ends by means of clamping bolts on the inside and by tensioning cables on the outside. Axial movement of the coil end is made possible by means of bolts which are secured in the outer mounting arms and which slide in elongated holes of a mounting arm screwed together with the pressure plates of the laminated stack. Although a relatively rigid mounting arrangement is obtained by such a method of securing the coil ends, the elliptical deformations of the coil end caused by vibrations of the rotating electric field, and unilateral stresses in the event of short circuits cannot, howver, be controlled to the extent desired with such a support.

In contrast thereto, an object of the present invention is to provide a short-circuit and shock resistant support for the coil ends in the direction toward the generator housing as well as between the conductor bars which is shear-resistant and bending-resistant, and which prevents excessive vibration of the whole stator winding head as well as of the conductor bars and the securing means against each other.

The coil end support arrangement according to the present invention provides that the coil ends are surrounded on their outer periphery by a support ring extending over the entire circumference and are covered up at their inner periphery by segment-shaped cover plates, which likewise extend over the entire circumference, and that the conductor bars of the coil ends are rigidly clamped against the support ring by means of clamping bolts which are arranged in several rows and which engage the cover plates and the support ring. The individual conductor bars are supported against the support ring, the cover plates and intermediate plates arranged between the two conductor bar planes by plastically deformable inserts of a hardenable material which are inserted into circular slots in the support members.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
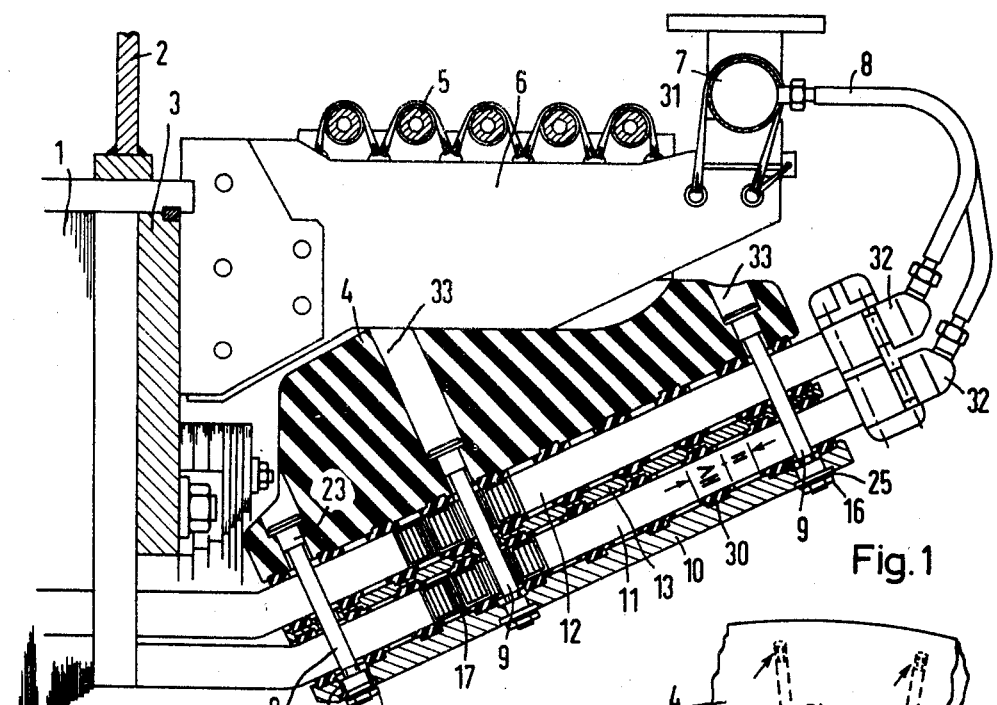
FIG. 1 is a longitudinal, cross-sectional view through a coil end with a support according to one embodiment of the present invention.

Referring to the drawings, FIG. 1 shows an axial cross section of a stator coil end. By way of example, a liquid-cooled stator winding is used, however,a winding with internal gas cooling may also be used. The winding has upper bars 11 and and lower bars 12 which extend axially from a laminated stack 1 of the generator and then bend radially on a cone in an involute-shape in a manner known per se as can also be seen from the development according to FIG. 2. In the Figures, only three conductors are shown in cross section, corresponding to the cross-sectional plane chosen, while for the purpose of a clearer presentation in the remaining area of the coil heads, only the outer contour of the conductors is shown. According to the invention, a support ring 4 is arranged radially outward parallel to the conical lower side of the lower bars 12. The support ring 4 extends over the entire circumference of the coil ends and may be made in one piece. Alternatively, in order to facilitate assembly, the support ring 4 may be divided into several pieces axially or tangentially. In such a case, however, the individual parts are firmly connected to each other so that a stable support ring results. The support ring 4 is supported at its outside circumference on individual arm 6 with an axially sliding relationship parallel to the axis. The arms 6 are screwed or otherwise fastened to a pressure plate 3 on the stator lamination stack 1 so that different thermal expansion between the winding head and the parts of the housing can be compensated. Connecting lines 5 of the winding are secured on additional mounting blocks 31 which in turn are arranged between the respective mounting arms 6 and rest on the support ring 4. A ring line 7 for the cooling liquid is fastened at the outermost ends of the mounting arms 6 and is connected with a coolant connecting chambers 32 of the individual bars by means of flexible hose lines 8.

In accordance with the invention, there are provided on the inner periphery of the coil ends, that is on the upper bars 11, segment-shaped cover plates 10 which adjoin each other snugly and likewise extend over the entire circumference and over the same width as the support ring 4. These cover plates 10 are connected, as will be described in further detail below, with the support ring 4 by means of clamping bolts 9.

In order to maintain the spacing between the upper and lower bars 11 and 12, segment-shaped intermediate plates 13 are inserted between the two planes of the bars.

Between the support ring 4 and the lower bars 12, between the lower bars 12 and the intermediate plates 13, between the intermediate plates 13 and the upper bars 11, and between the upper bars 11 and the cover plates 10 there are inserted into circular slots 14 cushions 30 which in general consist of filament-reinforced synthetic resin which is plastically deformable when the winding is assembled but which can be hardened later. On the one hand the cushions 30 fit themselves or conform to the external shape of the conductor bars 11 and 12, which are already relatively rigid in the assembled condition and are provided with a plastic-impregnated insulation, and to the fastening parts 4, 13 and 10, while on the other hand, the cushions 30 are disposed in such a manner that all spaces are filled and bridged. The cushions 30 are deformed in such a manner when the bars are inserted that the cushions 30 are compressed flat and, therefore, extend beyond the width of the circular slots 14. The distance of the circular slots 14 is chosen so that more than 50% of the surface of the coil ends in the region of the support ring 4 is covered by the cushions 30 and a wide-area contact of the coil ends is thereby obtained. The arrangement of these cushions 30 in the circular slots 14 prevents lateral displacement of the bars during the winding and also later in operation, and assures uniform support of the bars. Local overstressing of the bars in the event of a short circuit can thereby be avoided.

For clamping the coil ends against the support ring 4, the previously mentioned clamping bolts 9 are provided. The clamping bolts 9 are arranged at the entire circumference of the winding head and in different rows and are screwed at their outer ends into threaded bushings 23 of metal or insulating material which in turn are inserted in corresponding holes 33 in the support ring 4. On their other ends, the clamping bolts 9 are tightened or bear against the cover plates 10. For this purpose eccentrically or concentrically drilled conical fitting sleeves 15 are placed into the corresponding holes of the cover plates 10. Conical extensions on nuts 16 screwed onto the clamping bolts 9 engage the sleeves 15. Through appropriate rotation of the conical sleeves 15, any eccentricity in the location of the clamping bolts 9 that might exist can thereby be compensated.

Figure 3:
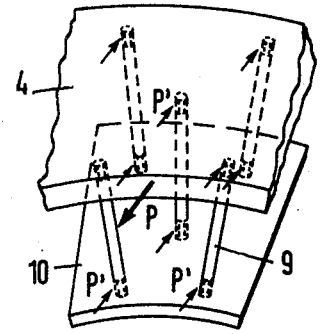
FIG. 3 is a schematic representation of the clamping and the distribution of the acting forces.

The clamping bolts 9, therefore, serve to rigidly connect the cover plates 10 located on the inside and the support ring 4 located on the outside and to firmly clamp the interposed conductor bars 11 and 12 so that a compact, shear-resistant and bending-resistant winding head is obtained. However, the clamping bolts 9 have the additional purpose to take up and carry off forces exerted by the bars in the circumferential direction. By securing the clamping bolts 9 on both sides, their carrying capacity for forces that may occur is thereby increased considerably. A form-locking connection of the clamping bolts 9 among each other is established, on the one hand, by means of the support ring 4 and, on the other hand, by means of the cover plates 10 which adjoin each other tightly. This is particularly advantageous because, in the event of a short circuit, every zone of the winding head is endangered and the very high short-circuit forces can attack locally at any point of the circumference. As may be seen from the schematic illustration according to FIG. 3, the short-circuit force, which is characterized by the heavy arrow P and acts, for example, on one clamping bolt 9, is transmitted over a larger number of clamping bolts 9 which are arranged in the vicinity, through the tensional connection of the clamping bolts 9 with each other via the support ring 4, on the one hand, and the cover plates 10, on the other hand, whereby overall, the smaller respective forces P' act on the individual clamping bolts 9.

Figure 2:
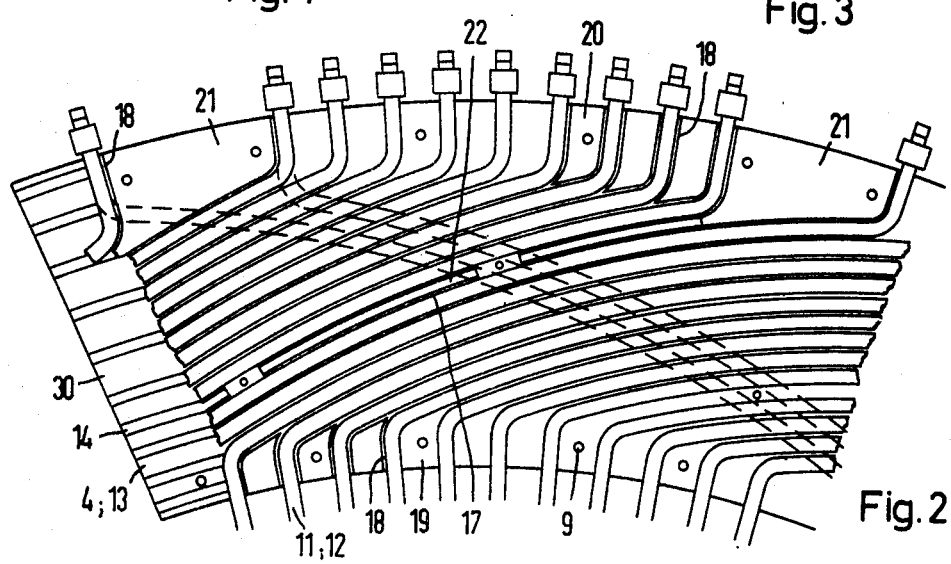
FIG. 2 is a view from the inside onto a development of the stator coil ends shown in FIG. 1.

In FIG. 2, a development of the stator coil ends is shown in a view from the shaft, where the cover plates 10 situated on the inside are omitted in order to show the arrangement of the conductor bars and their spacing more clearly. At the lefthand edge of FIG. 2 are shown in a further partial section, the configuration of the circular slots 14 which are machined into the support ring 4 and the intermediate plates 13 and which are filled by the cushions 30. The spacing of the involute-shaped conductor bars 11 and 12 in the axial direction is accomplished by stuffing the interspaces with the same hardenable plastic material 17 with which the circular slots 14 are also filled. The relatively small conductor bar spacings within a phase group are completely filled with this material 17, while the enlarged spacings at the phase change points are bridged on both sides by the interposition of a spacer 22 and a corresponding lining. This method of axial spacing may also be seen from the partial cross section of the conductors in FIG. 1.

The conductor sections before and after entering or leaving, respectively, the involute-shaped part of the winding head are spaced by spacers 19, 20 or 21 which are preformed and fitted to the space between the conductors. The lesser air gaps provided toward the conductor serve for filling up the radial conicity of the parts, caused by manufacturing reasons, with a cast-resin filling 18. All materials used for the spacing can be separated without difficulty, if required, from the winding and mounting parts by interposing separation foils or an appropriate surface treatment. In this process, all hardenable cushions and materials are hardened, after spacing and clamping the winding head, by supplying heat. After the hardening, the clamping bolt nuts 16 are tightened by means of tightening discs or cup springs 25 or by means of spring elements arranged between the support ring 4 and the cover plate 10, so that the cover plates 10 press the bars 11 and 12 permanently against the cushion pads 30. Through this pretension, a compact, short-circuit-resistant winding head is obtained which can nevertheless expand relative to the housing in the axial direction.

Figure 4:
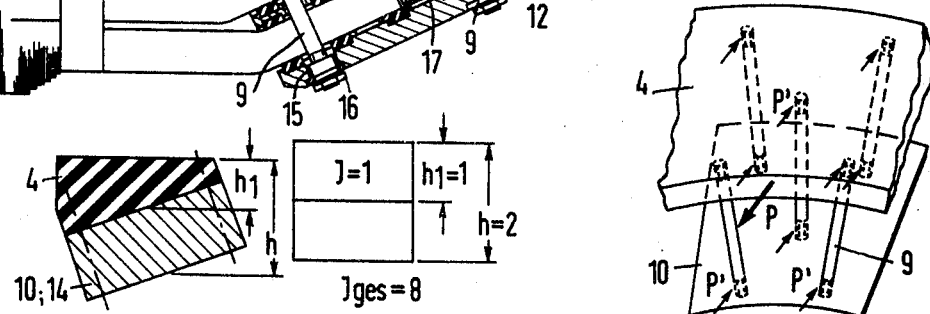
FIG. 4 is a schematic representation illustrating the increase in the stiffness through a larger moment of inertia of the rigid coil end.

As may be seen from the schematic presentation according to FIG. 4, the total height $h$ of the cross-sectional area is about doubled over the height $h_1$ of the support ring 4 alone by the pretensioned connection of the compact winding head with the support ring 4. Corresponding to the ratio of the moments of inertia, this results in about an eight times greater stiffness against ring deformations as previously mentioned in the introduction.

We claim:

1. In an electric machine having a stator lamination stack, pressure plates for the stack and a stator winding formed with conductor bars and having a coil end, the coil end having conically shaped conductor sections extending transversely to the to the axis of the machine, a support for the coil end of the stator winding, a radially outwardly disposed support ring connected to the conductors of the coil end and extending over the entire circumference of the coil end, radially outwardly disposed holder arms secured to the pressure plates of the stator lamination stack, said support ring being axially displaceably guided on said holder arms, radially inwardly disposed cover plates extending over the entire circumference of the coil end, clamping bolts disposed in a multiplicity of rows and extending through the support ring and said cover plates and clamping them, with the conductor bars of the stator winding as well as plastically deformable cushioning members of hardenable material interposed therebetween, all together into a unitary structure resistant to shear and bending in all directions of stress.

* * * * *